(12) United States Patent
Jiang et al.

(10) Patent No.: US 11,120,623 B2
(45) Date of Patent: Sep. 14, 2021

(54) OPTIMIZED VOLUMETRIC VIDEO PLAYBACK

(71) Applicant: HypeVR, San Diego, CA (US)

(72) Inventors: Caoyang Jiang, San Diego, CA (US); Xiaolin Liu, San Diego, CA (US); Jason Juang, San Diego, CA (US); Qi Yao, San Diego, CA (US); Anthony Tran, San Diego, CA (US)

(73) Assignee: HypeVR, San Diego, CA (US)

( * ) Notice: Subject to any disclaimer, the term of this patent is extended or adjusted under 35 U.S.C. 154(b) by 0 days.

(21) Appl. No.: 16/912,343

(22) Filed: Jun. 25, 2020

(65) Prior Publication Data

US 2020/0410752 A1    Dec. 31, 2020

Related U.S. Application Data

(60) Provisional application No. 62/866,426, filed on Jun. 25, 2019.

(51) Int. Cl.
*G06T 17/10* (2006.01)
*G06T 17/20* (2006.01)
*G06T 19/00* (2011.01)
*G06T 15/20* (2011.01)
*G06T 15/08* (2011.01)

(52) U.S. Cl.
CPC ............. *G06T 17/10* (2013.01); *G06T 15/08* (2013.01); *G06T 15/20* (2013.01); *G06T 17/205* (2013.01); *G06T 19/006* (2013.01)

(58) Field of Classification Search
None
See application file for complete search history.

(56) References Cited

U.S. PATENT DOCUMENTS

| | | | | |
|---|---|---|---|---|
| 6,516,093 B1* | 2/2003 | Pardas | ...... | G06T 9/40 |
| | | | | 345/419 |
| 6,990,248 B2* | 1/2006 | Pardas | ...... | G06T 9/001 |
| | | | | 345/419 |
| 8,884,955 B1* | 11/2014 | Hsu | ...... | G06T 17/205 |
| | | | | 345/421 |
| 9,618,747 B2* | 4/2017 | Villmer | ...... | G06F 3/012 |
| | | (Continued) | | |

OTHER PUBLICATIONS

Hosseini et al., Adaptive 360 VR Video Streaming: Divide and Conquer!, Dec. 2016, IEEE, 107-110 (Year: 2016).*

*Primary Examiner* — Robert J Craddock
(74) *Attorney, Agent, or Firm* — Jonathan Pearce; SoCal IP Law Group LLP

(57) ABSTRACT

A system and method for processing volumetric video is disclosed. The process includes receiving three-dimensional mesh data and texture data defining three-dimensional and textural characteristics of a physical location captured as volumetric video, dividing the three-dimensional mesh data into sub-parts defining a mesh tile, each mesh tile making up only a portion of the three-dimensional mesh data, and identifying a sub-part of the texture data defining a texture tile, the texture tile corresponding to each of the sub-parts of the mesh tiles and including only texture data relevant to an associated mesh tile. The volumetric video may be encoded by encoding each mesh tile independent of the three-dimensional mesh data as a mesh tile video and each texture tile independent of the texture data as a texture tile video.

5 Claims, 12 Drawing Sheets

(56) References Cited

U.S. PATENT DOCUMENTS

| | | | |
|---|---|---|---|
| 2005/0226196 A1* | 10/2005 | Suh | H04L 67/12 |
| | | | 370/338 |
| 2014/0267262 A1* | 9/2014 | Masry | G06T 17/20 |
| | | | 345/423 |
| 2018/0152688 A1* | 5/2018 | Graziosi | H04N 19/85 |

* cited by examiner

OPTIMIZED VOLUMETRIC VIDEO PLAYBACK

RELATED APPLICATION INFORMATION

This patent claims priority from U.S. provisional patent application No. 62/866,426 entitled "Optimized Volumetric Video Playback" filed Jun. 25, 2019. The entirety of this application is incorporated by reference as if set forth herein.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to live action three-dimensional volumetric video compression, decompression and playback. More specifically, the disclosure describes the combination of live-action stereoscopic video and LIDAR to generate a detailed set of three-dimensional data from which three-dimensional volumetric video may be created along with the methods employed in compressing that three-dimensional volumetric video in such a way that it may be transmitted, decompressed, and presented on a virtual reality or augmented reality headset.

Description of the Related Art

Looking back at the history of video recording technologies, it has moved from black-white to color, from low resolution (360p or 720p) to today's ultra-high resolution (4K or 8K) video, from analog storage to digital storage, and from machine profile as large as a suitcase to today's cellphone that can easily fit in a pocket. However, the way that videos are presented to the viewers has not changed much since the dawn of video recording. Even until today, mainstream videos are simply time-based dynamic content bounded in a flat and rectangular box, displayed on a monitor.

Conventional video is a sequence of 2-dimensional (2D) images captured over a period of time. During the playback, 2D images are presented to the viewer at equally spaced time interval called frame, and spacing is determined by a frame rate. For example, a 30 frame-per-second (FPS) video has a display interval of about 33.3 millisecond (1/30). If playback frame rate does not match with the captured frame rate (e.g. if there is a mismatch in the timing between the two), either slow motion or fast motion will be perceived by the viewer which are both unpleasant experience. For 2D video, the only content presented at each frame is an image, but a frame is not limited to just an image.

With the advancements in camera, general computing and computer vision technologies, it is now possible to record live action scenes in 3-dimensional form where a viewer is able to see a captured three-dimensional scene from any perspective. The authors of this patent made a breakthrough in creating a camera capture system and post-processing algorithms that transform live action scenes into 3-dimensional digital data. In furtherance of those goals, the authors also developed a custom codec to play, stream and store 3-dimensional content.

There are many ways to create 3-dimensional videos and each has its pros and cons. For example, one technology called depth-from-stereo uses an array of pairwise statically placed cameras to capture a center region of interest (ROI) and estimate distances from each camera pair to the surfaces of the ROI. Such technology relies on the high resolution of the camera, high accuracy of the depth estimation algorithm and accurate blending of color. Despite the differences between all capture technologies, the end result after the reconstruction of a 3-dimensional scene is a common format called mesh, which contains 3D geometric information regarding the captured object.

A flowchart for three-dimensional capture and encoding is illustrated in FIG. 5. First, volumetric capture takes place at 500. In this process, three-dimensional data captured using LIDAR, infrared, or other depth-sensing technologies is created for a given space. In addition, simultaneous video content is captured that may be used as textures for the captured three-dimensional data. The combined volumetric content that is captured at 500 is reconstructed as three-dimensional data at 501. The data is output as volumetric content (e.g. volumetric video) that includes at least two components, namely a mesh sequence 502 and a texture sequence 503. As discussed below, the mesh sequence is a time-based series of geometric shapes while the texture sequence is a time-based series of textures (typically video) that are overlaid on those shapes to create a three-dimensional environment that is remarkably lifelike and includes geometric shapes that may move past, over, under, and around within a virtual environment. Unlike traditional games, the space is captured in a real location and reproduced as the volumetric content. In the playback, meshes and textures are presented frame-by-frame to the viewer, creating a moving 3D object that may be viewed from any angle.

Mesh is a representation used in the field of computer graphics for storing and rendering attributes of 3D models. Any 3D model, regardless whether live captured or computer-generated (like video games), must satisfy basic criteria for rendering, and one of the most important criterion is how a model is represented. In a valid 3D model for rendering, the surface of the model is approximated by a series of interconnected triangles called faces. Each triangle face consists of three interconnecting vertices, and each vertex has a position in a predetermined 3D space with attributes (x,y,z) defining its position in the 3D space.

Triangle faces and vertices with position attributes are sufficient to construct a 3D model. However, such a model would not be interesting to the viewer because there is no color on the mesh. There are two common ways to color a mesh: color every vertex and color every face. The second approach generates better results since it has better accuracy in filling in colors on the faces than the first approach. To carry out face coloring, a 2D texture map is created or pre-generated for the mesh and a 2D texture coordinate (called U and V coordinate) is assigned to every vertex for the purpose of face color lookup. The color of any face can be determined by locating the triangular area on the 2D texture map bounded by the three UV coordinates of the three interconnecting vertices of the face.

To keep this discussion concise, mesh mentioned from here on only consists of vertices having position and texture coordinate and faces that are triangles. It is also implied that a mesh has a 2D texture map for face color lookup. Other mesh systems (e.g. more than three vertices or using other texture map systems) are also possible.

When a 3D model in mesh form is captured over time (e.g. during three-dimensional scene capture), it forms a 3D or volumetric sequence. A structure and attributes of a volumetric sequence and its components is shown in FIG. 4. For storage and encoding purpose, the vertex data (X,Y,Z, U,V) and face data are stored together forming a mesh sequence while texture map is stored separately forming a (2D) texture sequence. Sequence refers to the content that is immediately produced from the reconstruction but is not transformed into another format for the purpose of storage, transportation, streaming and playback. Data from the mesh and texture sequences has one-to-one correspondence (due to the UV coordinate) in time, so they must be played together to ensure correct presentation. Otherwise, the model and/or texture will appear incorrect to a viewer.

An important processing technique that is often applied on the mesh sequence and texture sequence is mesh tracking. This technique is usually carried out whenever possible to increase the similarity between neighboring meshes and significantly improves the later compression when the sequences are transformed into videos. This process is applied to a fixed size frame group, called a temporal consistent group. Within a group, starting from the first mesh frame (key frame), vertices of subsequent mesh frames (non-key frames) are successively tracked to those in the previous frame. At the end, the mesh frames within each temporal consistent group have identical face index and texture coordinate values, but with a changing position coordinate value. Since face indices and texture coordinates are identical within a group, the information only needs to be stored once for the key frame, and only an indicator (e.g. from which key frame to copy indices and coordinates from) needs to be stored for the non-key frames, which saves a significant storage space and transmission bandwidth. Position coordinates that are tracked possesses high inter-frame correlation and can be compressed with high efficiency. Having so many advantages in the tracked meshes, it is highly desirable to keep the temporal consistency property while applying any other optimization technique.

A typical single frame of live action, three-dimensional volumetric video in native format can be up to three gigabytes of data. At 24 or 30 or 60 frames per second (fps), the data rate to stream such data can be upwards of 72 or 90 or 180 gigabytes per second. Likewise, even a 2-minute video (120 seconds@24 fp) is 8,640 gigabytes. Using current technologies, these data rates and storage capacities are extremely technologically and cost prohibitive for a typical consumer-grade computer system. Obviously, technology will advance and prices will come down, but in the meantime, providing this technology to the masses proves difficult.

In order to enable storage and transmission of the captured data in an intelligent and cost-effective fashion, a compression and decompression algorithm that significantly reduces the complexity of the captured data, both textures and vertices with minimal negative impact on the quality of the playback to an end-viewer of the content is desirable.

Figure 1:
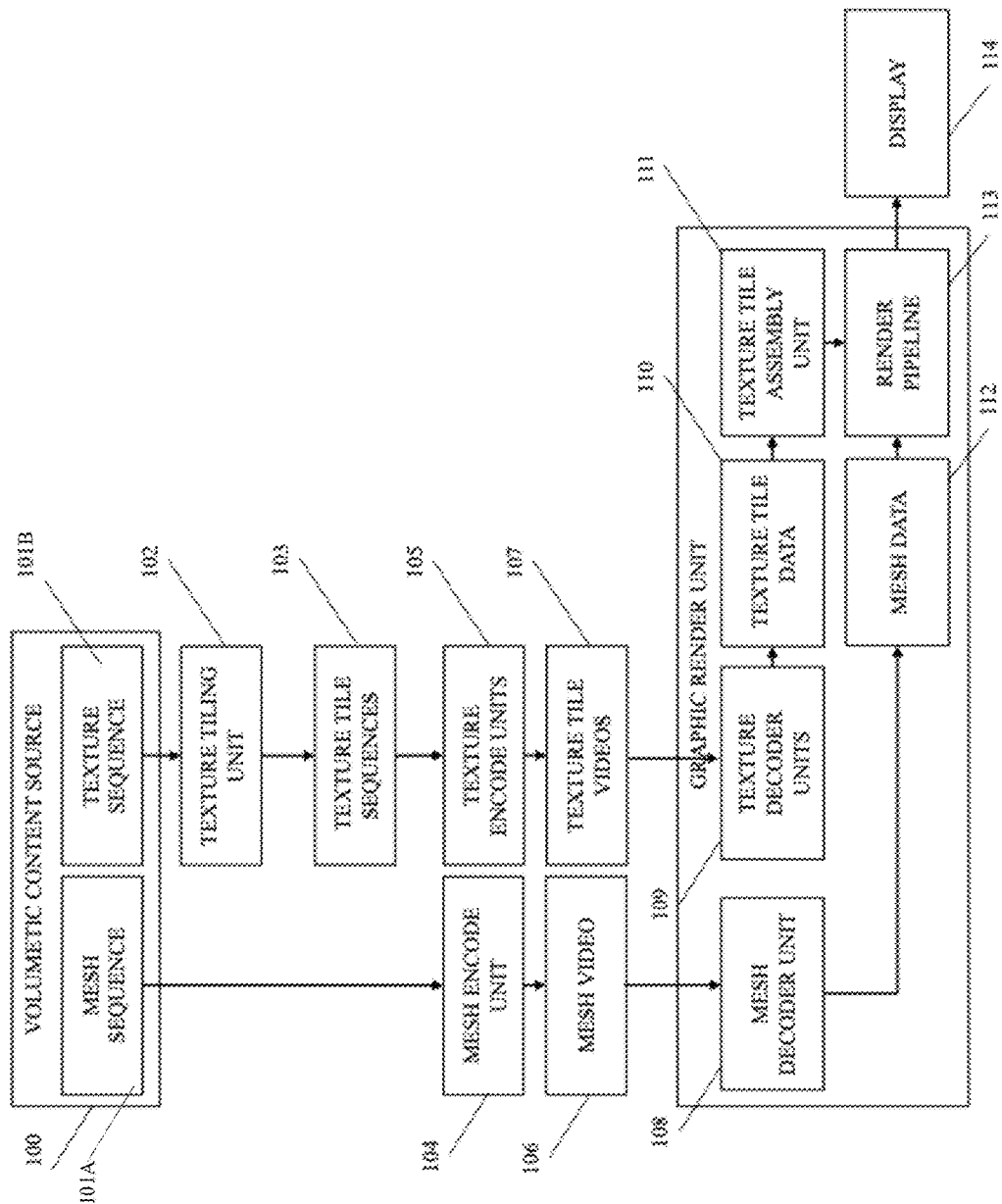
FIG. 1 is a functional block diagram of a system for texture map video tiling.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Better capture and reconstruction technology for volumetric video aims to increase the fidelity of the reconstructed model leading to higher resolution texture for finer detail and higher geometric complexity (high vertex and face count) for more accurate surface approximation. Experience shows that a model captured from 96 4K-cameras using depth-from-stereo reconstruction requires at least a 4096-by-4096 texture map and a mesh with 60,000 vertices and 40,000 faces. As a result, the associated data is incredibly processor intensive under current consumer-grade processing capabilities or mobile devices. High resolution texture maps, therefore, pose serious problems during the playback as devices like typical mobile phones have no capability of decoding such high-resolution textures while rendering at a desired frame rate such as 60 frame per second. High vertex and face counts for the associated three-dimensional models typical in volumetric video impose yet another heavy burden on the rendering pipeline, slowing down the rendering speed and creating a sluggish, undesirable experience. Other systems including three-dimensional sensors such as LIDAR or infrared, or sonic-based depth sensors may also be used alone or in conjunction with stereo camera pairs to capture or generate mesh data and/or texture data.

The source of both problems is essentially one of lacking sufficient computational resources on most devices or, stated in the alternative, having too much data for currently-available technology to handle competently while maintaining fluidity of the volumetric video experience for a viewer. To mitigate this problem and achieve smooth playback of high-demand volumetric content requires optimization of the content while minimizing any detrimental effect on the final rendering quality of the scene. To this end, three tiling techniques involving mesh and texture are disclosed which reduce resource consumption and improve resource utilization during the playback. These techniques operate while creating minimal or no negative impact on volumetric video fidelity. The first technique is called texture map video tiling. This technique divides texture into multiple sub-texture tiles so that during the playback sub-textures are decoded in parallel by different logical or physical processors or cores to accelerate processing speed. The second technique is called mesh video tiling. This technique divides mesh video into multiple pieces and performs view-dependent (e.g. reliant upon a camera location and visibility) mesh decoding and rendering. The third technique is called mesh+texture map video tiling. This technique is a version of mesh video tiling where per mesh tile texture is created to further reduces the amount of data required for view-dependent decoding and rendering.

Texture map video tiling is a division process applied on the 2D texture map. For example, a 1024-by-1024 texture map sequence is partitioned horizontally into four sub-texture map sequences where each tile has dimension of 256-by-1024. The purpose of having multiple tiling texture is to take the advantage of multiple core CPUs that are commonly found on playback devices to increase texture map decoding speed by running them in parallel. By dividing the texture map into multiple components, a portion of each texture map may be decoded by independent CPUs or CPU cores, increasing throughput by nearly the number of CPUs or cores available (e.g. 2× for two cores). Even most mobile devices presently have at least two cores, and many times four or six cores. When texture tile videos are subsequently decoded, they are reassembled into the original full texture map and sent to the rendering pipeline for color sampling.

Turning now to FIG. 1, a system for texture map video tiling is disclosed. A volumetric content source 100 includes a mesh sequence 101A and a texture sequence 101B. As used herein, the phrases "volumetric content" or "volumetric video" means a series of frames of three-dimensional content that includes three-dimensional attribute data, texture data that is video to be wrapped around the three-dimensional attribute data, as well as time-based data such that both the texture and three-dimensional attribute data may change over time when viewed linearly. In shorthand, the volumetric video or volumetric content is a video in which a viewer may move around within as is typical in video games, but that is recorded video of a live scene or experience and includes three-dimensional data representative of the area and objects within that area that is recorded.

In the context of FIG. 1, the volumetric content source 100 includes a mesh sequence 101A and texture sequence 101B. The mesh sequence 101A is a time-based sequence of meshes that represent three-dimensional objects recorded in an area being filmed or recorded using appropriate volumetric video capturing systems. These may be or include stereographic camera systems and/or LIDAR or infrared or other depth-sensing cameras or sensors in additional to traditional RGB cameras. The mesh sequence 101A is time-based in the sense that three-dimensional objects represented by that mesh may change over time, both in shape and in location. An automobile being recorded at time t=0 may be very near a viewer in a given location. That same automobile at time t=10 may be many feet further away. The three-dimensional mesh representing that object in volumetric video may be smaller and in a different location relative to a viewer from time t=0 to time t=10.

Likewise, the texture sequence 101B is a set of time-based data representing the texture to be applied to the mesh sequence 101A. It is time-based in the sense that an individual represented within the three-dimensional meshes and associated textures may have a change of facial expression within a given scene as time goes on. The associated texture for that individual's face may change accordingly. Water in the scene may have a tide or waves. Trees may sway and blow. The sun may rise or set. All of the changes in the colors and images, separate from the meshes representative of those objects, may change in a given sequence. In a typical case, these texture sequences may be most easily stored or represented as a series of frames of video that is "wrapped" around the mesh sequence 101A. The textures may update each frame or only periodically, or some may remain fixed, while others update from frame-to-frame of the volumetric content source 100.

Figure 6:
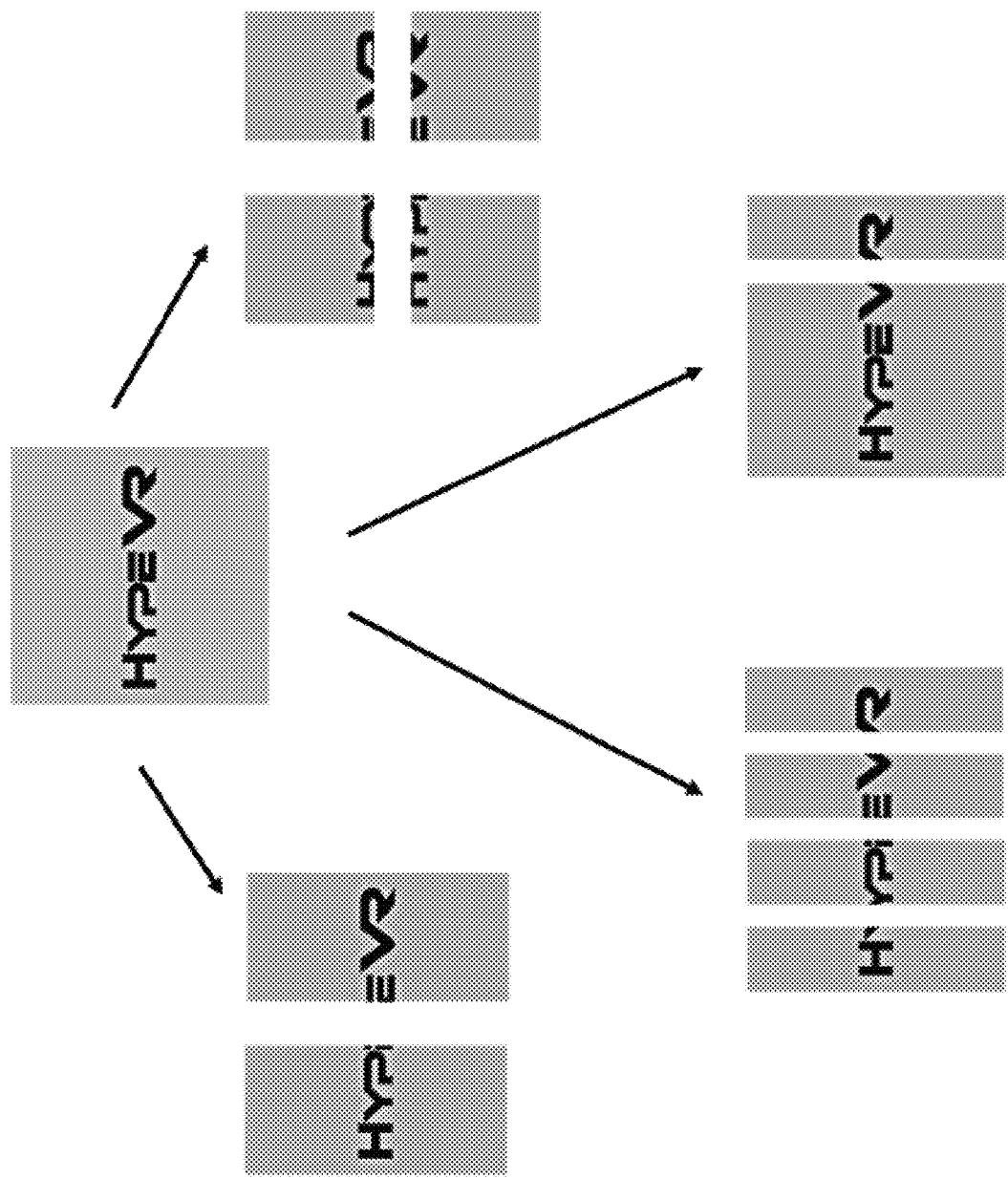
FIG. 6 shows four examples of texture partitioning strategies.

The texture tiling unit 102 partitions the original texture according to the pre-defined parameters into multiple sub-texture maps, forming texture tile sequences 103. For a simple partition, parameters may include the number of tiles to be obtained and the partition direction. For advanced partitioning, individual tile dimension and position is specified. Four example, texture partitioning strategies are discussed below with reference to FIG. 6. Generally, the more tiles that are generated, the better core/thread utilization will be achieved. Even when there are more tiles than cores, the cores can be efficiently used to move through the textures as each tile is completed by one of the cores. In short, the problem is sub-divided into smaller chunks so that the data may be operated upon efficiently.

However, even with same number of resulting texture tiling counts, different partitioning strategies may have different impacts on the texture compression and decompression performance. It is ideal to spend a reasonable amount of effort to try out the four strategies shown in FIG. 6 and other partitioning strategies derived from these four. After partitioning, texture tile sequences 103 are then encoded through texture video encoders 105 into texture tile videos 107. The texture tile videos 107 may be one individual video texture for an entire set of meshes, or may be sub-divided per object or for portions of the scene into a number of texture tile videos 107.

The mesh sequence 101A goes through a mesh encode unit 104 for mesh encoding processing resulting in a mesh video 106. The mesh encode unit 104 takes a received mesh sequence and attempts to represent the mesh sequence efficiently over the course of many frames of volumetric video. This may involve effectively storing "key meshes" much like key frames in video encoding, and then the associated transforms of those key meshes until a new key mesh is stored. These "key meshes" may act as ground truth for the three-dimensional data from which subsequent frames can be extrapolated. Meaning, transformations of the three-dimensional data may be used for frames between each key mesh, rather than all of the mesh data to conserve storage space and transmission bandwidth. Alternatively, the mesh data may be encoded into each frame. Various techniques exist for encoding such data.

During playback by the graphic render unit, a mesh decoder unit 108 may operate to decode the associated meshes and generate associated three-dimensional models. Simultaneously, multiple texture decoders 109 (e.g. one or more may operate on each available CPU core) are created to carry out simultaneous decoding on all texture tile videos 107. Once texture tile frame data 110 are obtained, they are reassembled 111 into a full texture map (using the pre-defined parameter that was used for partitioning) of the original full texture, which is then sent to the rendering pipeline 113. Texture tile data 110 corresponds to the way in which the texture tile was split into components as texture tile sequences 103.

Simultaneously, the mesh decoder unit 108 decodes and pushes mesh frame data 112 into the rendering pipeline 113 as well. With mesh and texture data both received, rendering starts, and a rendered image is eventually drawn on the client device display 114. This rendered image has both mesh data and texture data for an entire scene (or an entire visible scene) within the volumetric video which is then shown on the display 114. This process does not affect the temporal consistency property because the face indices and vertex attributes are not altered at all during this process.

Figure 2:
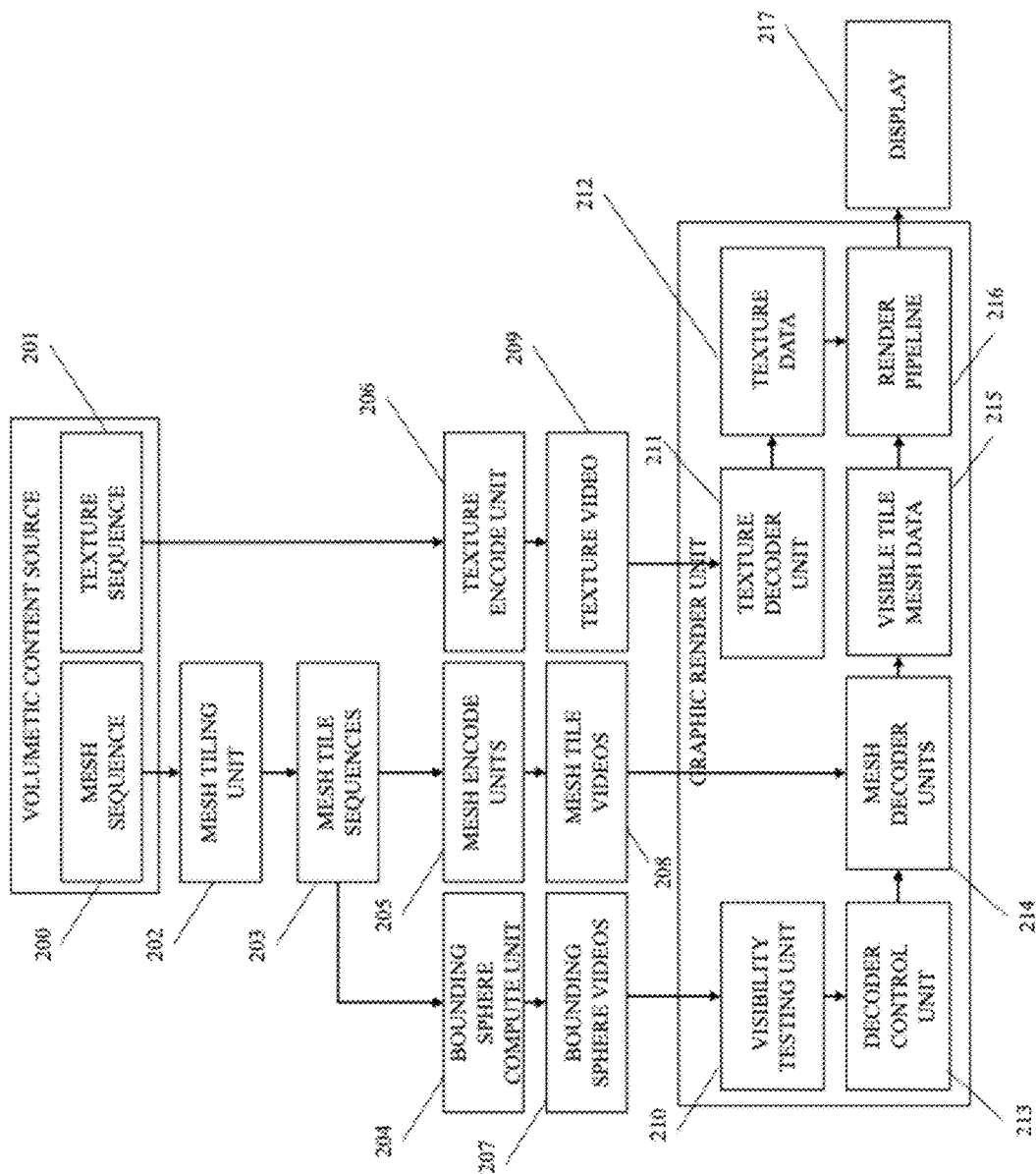
FIG. 2 is a functional block diagram of a mesh tiling and playback system.

A mesh tiling and playback system is shown in FIG. 2. Mesh tiling is a process where meshes are partitioned in three-dimensional spaces to form mesh tiles. This is much like the texture tiling concept in a broad sense, but this occurs in three-dimensional space. The difficult aspect that three-dimensional meshes introduce is where to intelligently "tile" the three-dimensional meshes. If this is done poorly, significantly uneven work can result for different CPUs. As such, there are many ways that mesh can be divided.

For example, one technique first sets a minimal (bounding) box enclosing every vertex of a given model, then the bounding box is equally divided in 3D space into 3D sub-spaces. Vertices and faces that fall into the same 3D sub-space form a mesh tile. An example outcome of mesh tiling is illustrated in the mastodon model of FIG. 7. As seen from the figure, the original 3D model is divided into multiple surface areas (each shaded in a different color) where each area is an independent mesh and neighboring meshes share the same vertices at the place they meet, which results in a seamless border. This seamless border is important when the mesh tiles are put back together. With them, the model should be able to be reassembled into the original full mesh of the associated model.

Figure 7:
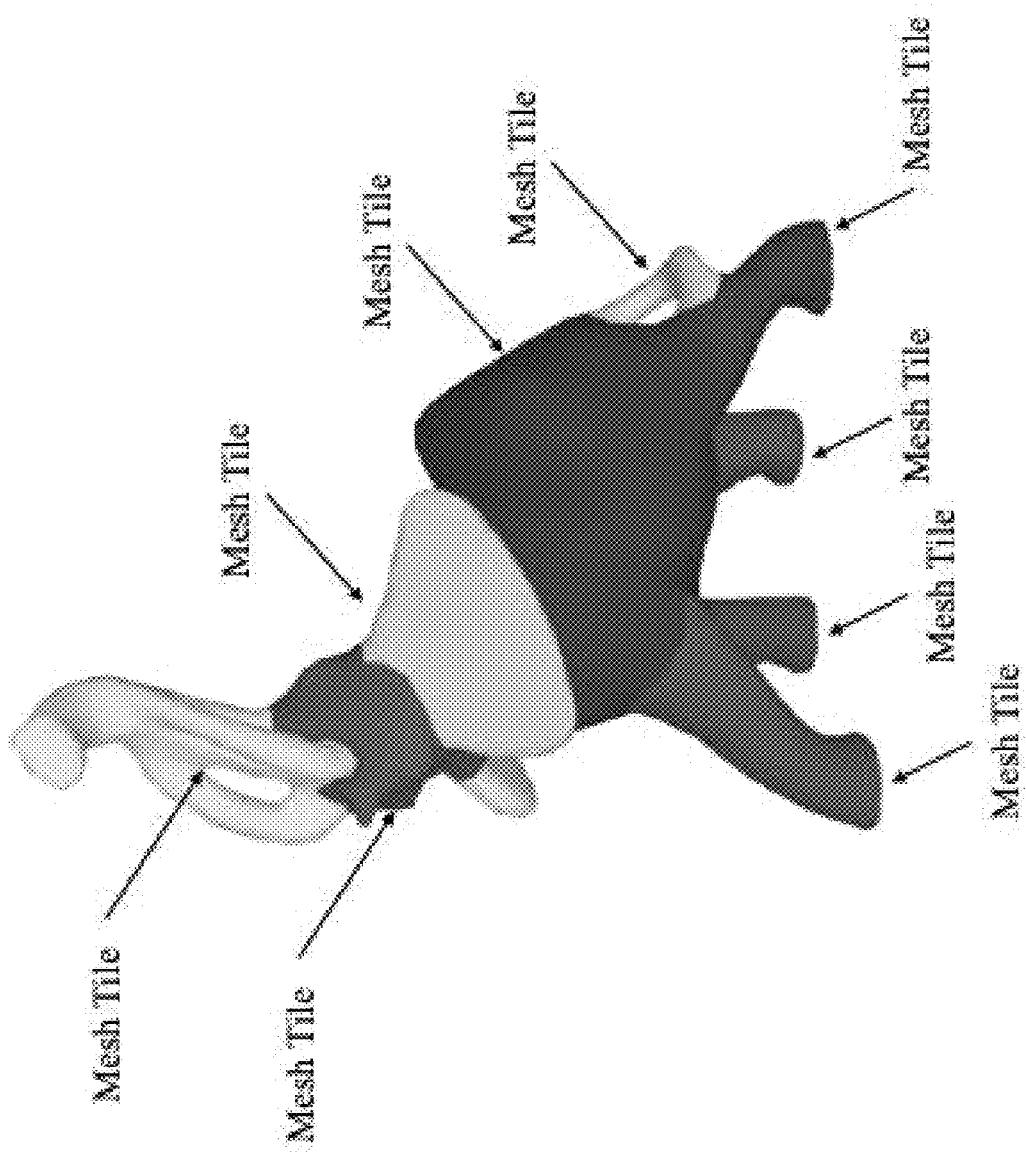
FIG. 7 is an example outcome of mesh tiling.

In fact, one way to generate the mesh tiles is to look for uniform borders or natural "edges" in models and to divide the tiles along those borders. The example shown in FIG. 7 is a complex model with rounded shapes. Geometric shapes are easy for computer algorithms to detect edges and natural break points. For example, a table may have a tabletop, and four legs. Computer algorithms can easily perform edge detection to detect the places where the legs join to the tabletop in the model and "cut" the mesh tiles into segments along the tops of those legs, creating a total of five mesh tiles, the tabletop, and each leg.

Precise division is usually not required as the number of vertices and faces among the tiles are relatively uniform, meaning that a different or the same algorithm can quickly "count" the number of vertices and/or faces in a sub-part of a model and automatically generate contiguous sections of that model that are roughly the same computational load since that load is based upon the number of vertices and/or faces. Generally, the larger the tile is, the more computation resource is spent on decoding and rendering the tile. Rendering the entire mesh, both three-dimensionally (e.g. the individual faces) and texturally (the texture on those faces) becomes inefficient when only very small section of a large tile is visible to the viewer.

To preserve temporal consistency, a key frame is tiled first. The key frame is an entire frame of volumetric video with all textural face and three-dimensional mesh information. Then, the tiling information (index of each face and vertex) from the key frame tiling are saved and applied to the subsequent non-key frames to instruct the tiling process. In this way, the overall data encoded is less than encoding all of the faces and their respective positions for each frame of volumetric video (e.g. 40,000 faces, every 33.3 millisecond). Since the non-key frames uses the same tiling scheme as the key frame, the temporal consistency is preserved.

Continuing with FIG. 2, as before a volumetric content source is made up of a mesh sequence 200 and a texture sequence 201. The texture sequence 201 is not specially treated and is directly sent to the texture encoder 206 for encoding, generating a single encoded texture map video 209. On the other hand, mesh sequence goes through the mesh tiling 202 process wherein a given model or an entire three-dimensional environment is sub-divided into a series of interconnecting mesh tiles. The result of that division is a series of multiple mesh tile sequences 203. These remaining sequences for the same reason that the mesh sequence was a sequence. Three-dimensional models can change in shape and location over time.

Mesh tile sequences are then encoded into mesh tile videos 208 using mesh encoders 205. A mesh encoder 205 is a system that transforms a raw mesh sequence into a much more compact format with zero to minor loss of integrity for efficient storage, efficient transmission, and efficient streaming. This can be done, for example, with reference to the key frame generated at the outset. For example, as is sometimes done with traditional two-dimensional video encoding, the meshes may be encoded on a frame-by-frame basis only to encode the differences relative to the most recent key frame mesh. In this way, the overall data needed to represent a mesh sequence may be relatively small as compared to fully encoding the entire mesh for each frame.

Substantially simultaneously, bounding sphere information is calculated 204 for every frame in a mesh tile, forming a bounding sphere video 207. A bounding sphere as used herein is a virtual sphere of minimal size that completely encloses the 3D model and is specified by the center point position and a radius from the center point. A bounding sphere is intended to be a close estimate of the 3D space that a model occupies and aids the visibility test to quickly determine the visibility of the 3D model. A bounding box or another shape can also be used for such a purpose, but a bounding box requires 6 values (Xmax, Xmin, Ymax, Ymin, Zmax, Zmin) whereas a bounding sphere only uses 4 values (Xcenter, Ycenter, Zcenter, Radius). This, again, assists the system in using less data and thus being less computationally complex and enables faster throughput for encoding and decoding or, in this case, determining whether or not something needs to be rendered.

Figure 11:
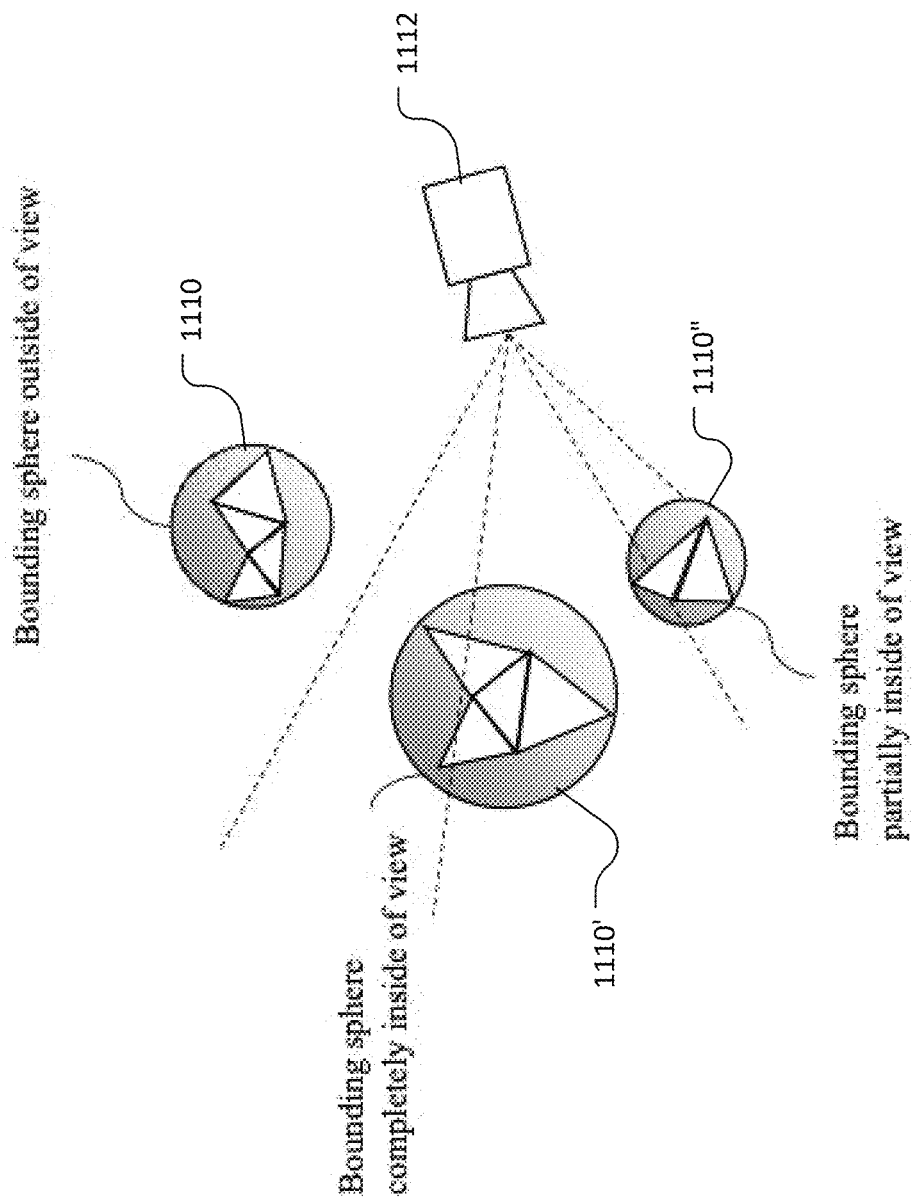
FIG. 11 is a visual representation of the options for camera visibility of a given three-dimensional model.

FIG. 11 shows a visual representation of the options for camera visibility of a given three-dimensional model. There are three visibility relationships between a model and the viewer as shown in this figure. In this figure, the viewer's point of view is modeled as the camera 1112 to determine whether to render a given model. The bounding spheres are circles 1110, 1110' and 11110" surrounding the 3D models (represented as triangles). If the perspective of the camera 1112 (viewer) incorporates a tile's bounding sphere, then that tile is flagged to be rendered. If the bounding sphere cannot be seen, then that tile is flagged not to be rendered. As should be understood, a model (or its sub-parts, tiles in this case) can be partially in the view, completely in the view or not in the view. Visibility test yields true when the 3D model is either partially in the view or completely in the view and yields false when the 3D model is outside of the view. By splitting the entire model into the tiles, the efficiency of the overall rendering pipeline can be increased dramatically, without performing a visibility check for the entire model as a whole.

Specifically, individual bounding spheres may be used for each mesh tile, meaning each sub-part of an overall three-dimensional model. If only a portion of the overall three-dimensional model is visible (or partially visible), then only that sub-part (that mesh tile) need be flagged for rendering. In this way, the entire model is not rendered, and full consideration of the model's complexity, vertices, and faces need not be operated upon each frame. Instead, the relatively low-overhead bounding spheres for each tile mesh may be checked, at substantial computational savings. Only those portions of the model are then rendered, rather than the model as a whole. Bounding sphere videos, mesh tile videos and texture map video are very helpful processes to carry out the efficient decoding and rendering.

Turning back to FIG. 2 for consideration of playback of the encoded meshes and textures, one mesh decoder 214 is allocated to each mesh tile video, and a texture video decoder 211 is allocated to each texture video. These mesh decoders 214 and texture decoders 211 may be allocated on a per-CPU core basis so that multiple decoders 211, 214 may operate simultaneously. However, a primary objective is to avoid the decoding and rendering of mesh tiles (and associated textures) that are not currently visible to the viewer. To accomplish this task, at every frame, all mesh tiles are subjected to action by the visibility testing unit 210 using their corresponding bounding sphere information. The result is a yes or no flag for whether a given mesh tile is visible or is not visible. Once completed, for every frame, visibility information for all mesh tiles is passed to the decoder control unit 213 where decisions of decoding are made for all mesh tile decoders operating on any CPU core. The mesh decoder units 214 operate only to decode meshes for visible mesh tiles, thus saving significant computing resources by ignoring non-visible meshes and associated textures.

Figure 9:
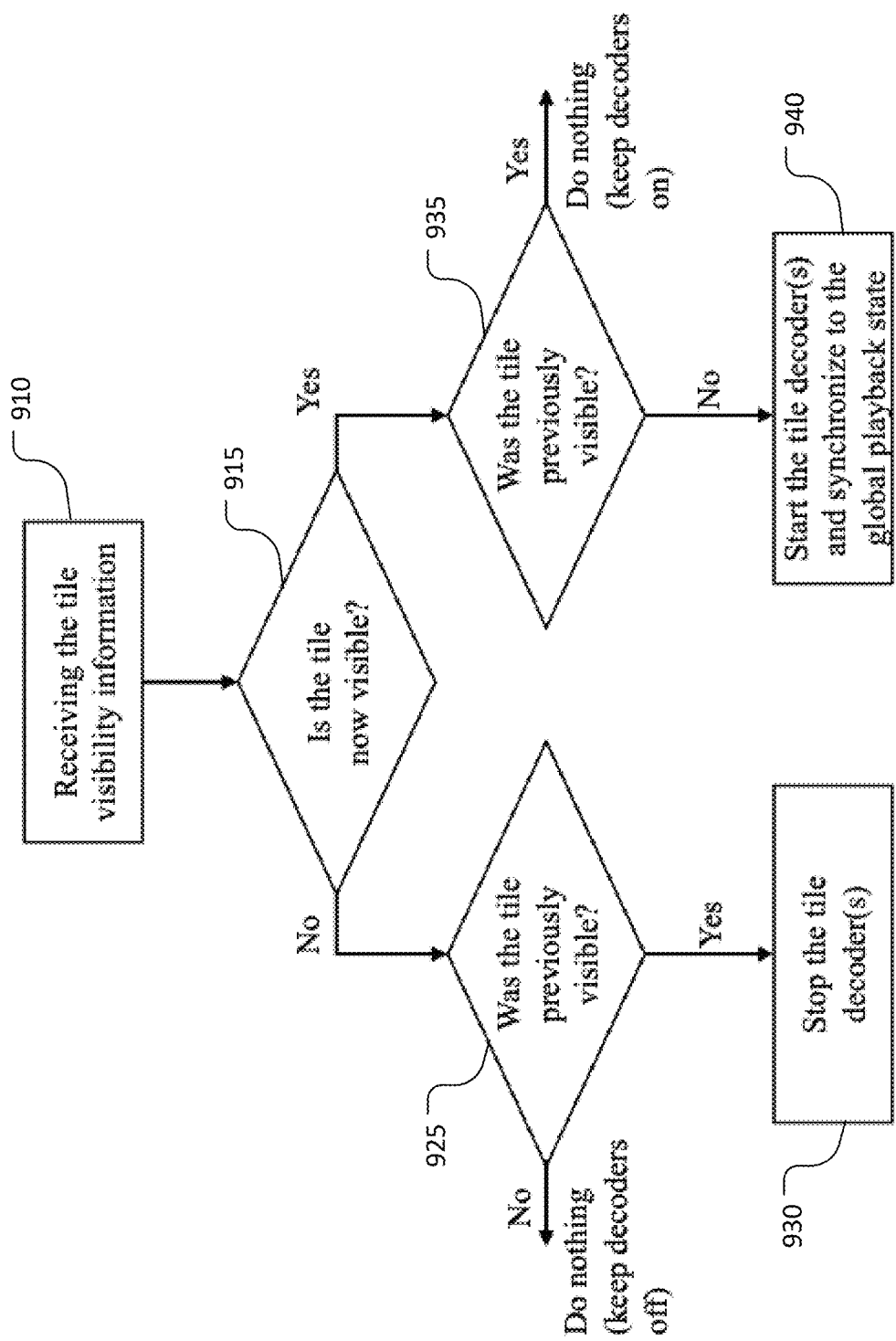
FIG. 9 is a flowchart of a process for enabling and disabling mesh decoders.

A flowchart of a process for enabling and disabling mesh decoders is shown in FIG. 9. First, tile visibility information is received at 910. This is the information created by the visibility testing unit 210 and passed to decoder control unit 213. The decoder unit operates to enable or disable a given mesh decoder that has been assigned to a particular mesh tile based upon the results of this process. First, the primary inquiry is whether the mesh tile is now visible at 915, meaning, a determination whether in the current video frame to be rendered is the sub-part of the overall three-dimensional model's bounding sphere within the visibility of the camera (see FIG. 11).

If not ("no" at 915), then the associated query is whether the tile mesh was previously visible (e.g. in the prior frame). If not ("no" at 925), then the associated mesh decoder must have already been off, since it was not visible, so there is nothing to do because the associated mesh decoder is already off. If so ("yes" at 925), then the associated mesh tile decoder was active in the most-recent prior frame, but should not be disabled, so the associated decoder(s) are stopped at 930.

Returning to present visibility, if a mesh tile is now visible ("yes" at 915"), then the system queries whether the associated mesh tile was previously visible at 935. If the mesh tile was previously visible ("yes" at 935), then there is nothing to do because the associated mesh decoder was already operating in the previous frame. If not ("no" at 935), then the associated mesh tile decoder should be started and data necessary to synchronize the mesh tile decoder with the overall rendering process should be provided at 940.

Returning to FIG. 2, the mesh decoders 214 corresponding to the mesh tiles that were visible in a previous frame and that remain visible in the current frame are enabled. The mesh decoders 214 corresponding to the mesh tiles that are not visible in the current frame are disabled. The mesh decoders 214 corresponding to the mesh tiles that was not visible in previous frame but has become visible in this frame are enabled and the internal state of these decoders are synchronized to the global playback state. Once the visible mesh tile data 215 and its corresponding texture data 212 are received, they are sent to the rendering pipeline 216 for rendering and eventually displayed on the client device display 217.

A third technique may apply both tile meshes with visibility testing and texture map tiling for significant computational savings. In the two aforementioned tiling techniques, texture tiling increase the efficient, computational resource usage by carrying out parallel video decoding and mesh tiling optimizes computational resource usage by avoiding the decoding of non-visible mesh tile videos (e.g. those faces that are behind the model or otherwise out of the view of the virtual camera). However, to maximize computational resource saving further requires generating texture map for individual mesh tile. This technique works in part because during the playback, instead of decoding the full texture (as in mesh tiling), only the texture maps for the visible mesh tiles are decoded. Generating per mesh tile texture map is not a simple combination of previous two methods. It takes multiple steps to create proper mesh+texture tiles.

Figure 10:
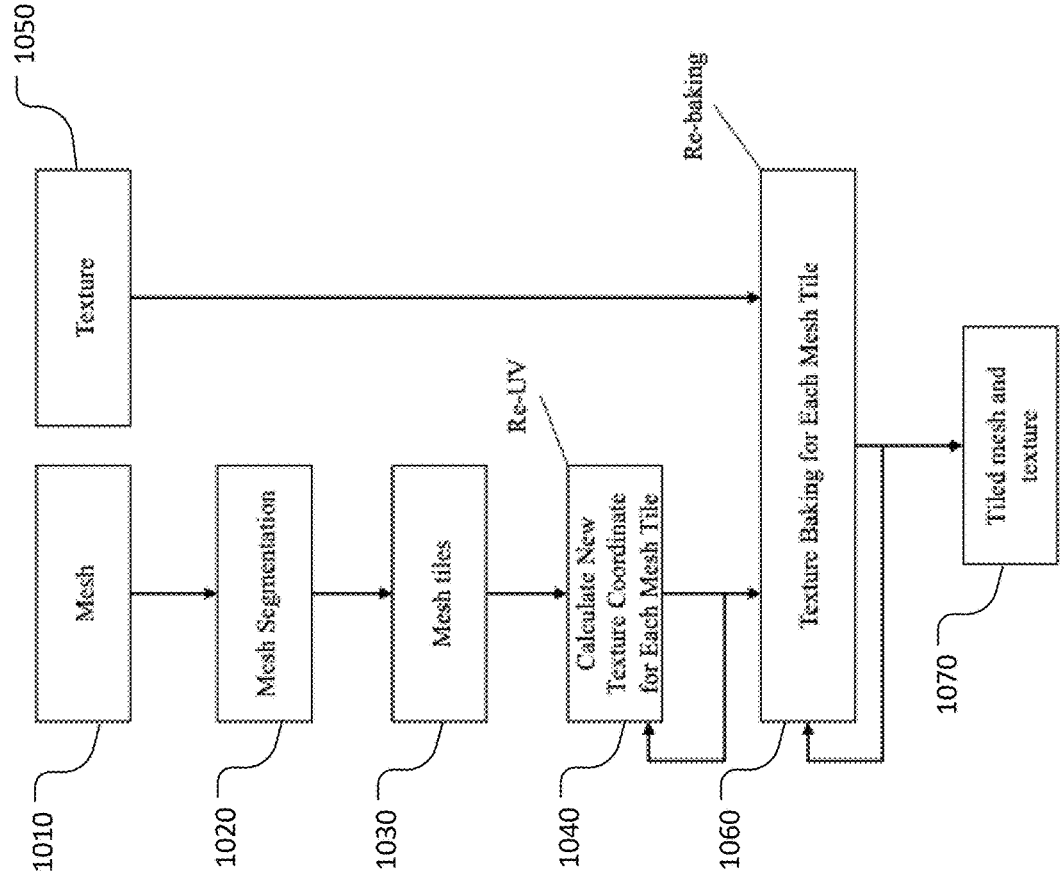
FIG. 10 is a flowchart of a process of mesh+texture processing.

A flowchart of a process of mesh+texture processing is shown in FIG. 10. First, the mesh 1010 goes through the same (bounding box based) tiling technique as described for mesh tiling to intelligently segment the mesh at 1020. This could use any number of techniques to select sub-parts of each mesh that should be used as the associated mesh tiles at 1030.

Then, a new set of texture coordinate is calculated for each mesh tile at 1040 through a process called re-UV for each mesh tile for referencing a new texture map to be constructed in the third step. This process serves to translate the existing texture 1050 map into the new sub-part mesh tile 1030 for each mesh tile at 1040. This operates to convert what may be one large or several large textures into smaller texture maps that may be used for each mesh tile.

The per mesh tile texture map is generated at 1060 via a process called re-baking where the color information are extracted from the original texture and put into a new texture map that is much smaller than the large original texture map. When the subsequent mesh tile is rendered (or not rendered), only the associated texture map associated with that mesh tile need be loaded into memory and rendered. To preserve temporal consistency, the key frame including all meshes and all texture goes through re-UV and re-baking process first and the texture coordinate and indices from the key-frame are propagated to the following non-key frames within a temporal consistent group. At each non-key frame, inherited texture coordinate and indices are used for re-baking. In this way, the same texture coordinate can be re-used without reloading it and can be tied to an associated face as it is applied to the mesh.

With mesh and texture both partitioned into tiles, another performance improving technique called multi-resolution texture map video may be applied. This is based on the observation that distance plays an important role in the amount of visible texture details to human eyes. Our experiment shows that the texture detail becomes less noticeable as the viewer moves further away from the model. When viewing a 3D model at a meter away, the texture details from a full-resolution texture map and a half-resolution texture map are undistinguished to the human eye. This indicates beyond certain distances the texture map resolution can be reduced without affecting the visual experience. To take advantage of this fact, texture tile sequences of all mesh tiles are encoded into multiple resolution videos by down sampling width and height with step of two and each resolution video is assigned with a tier ID. At tier 1, the texture tile video keeps the original texture tile width and height and full resolution. At tier 2, width and height are down-sampled by two and video has quarter the original resolution. At tier 3, width and height are down-sampled by four and video has one-sixteenth the original resolution. The number of tiers depends on the actual resolution of the original texture map. The higher the resolution of the texture map is, the more tier will be generated. During the playback, as the viewer moves freely across the space, not only mesh tiles are disabled as they go out of the sight but the texture quality of the visible mesh tiles are actively switched according to their distance to the viewer. This third technique is generally referred to herein as mesh+texture tiling.

The resulting output is a new set of elements making up mesh tiles and associated re-baked textures on a per-mesh-tile basis at 1070.

Figure 3:
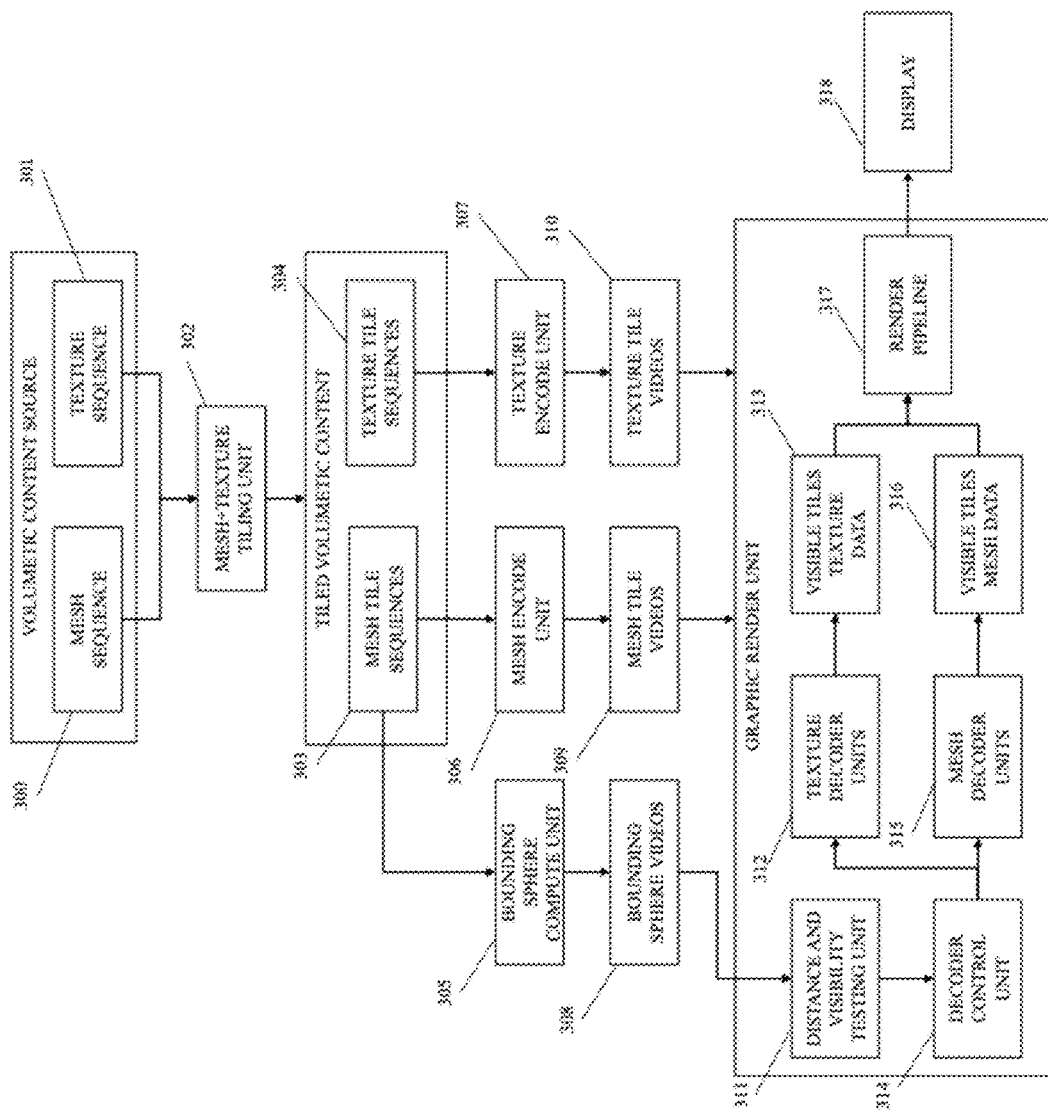
FIG. 3 is a functional block diagram of a system for mesh+texture tiling.
Figure 4:
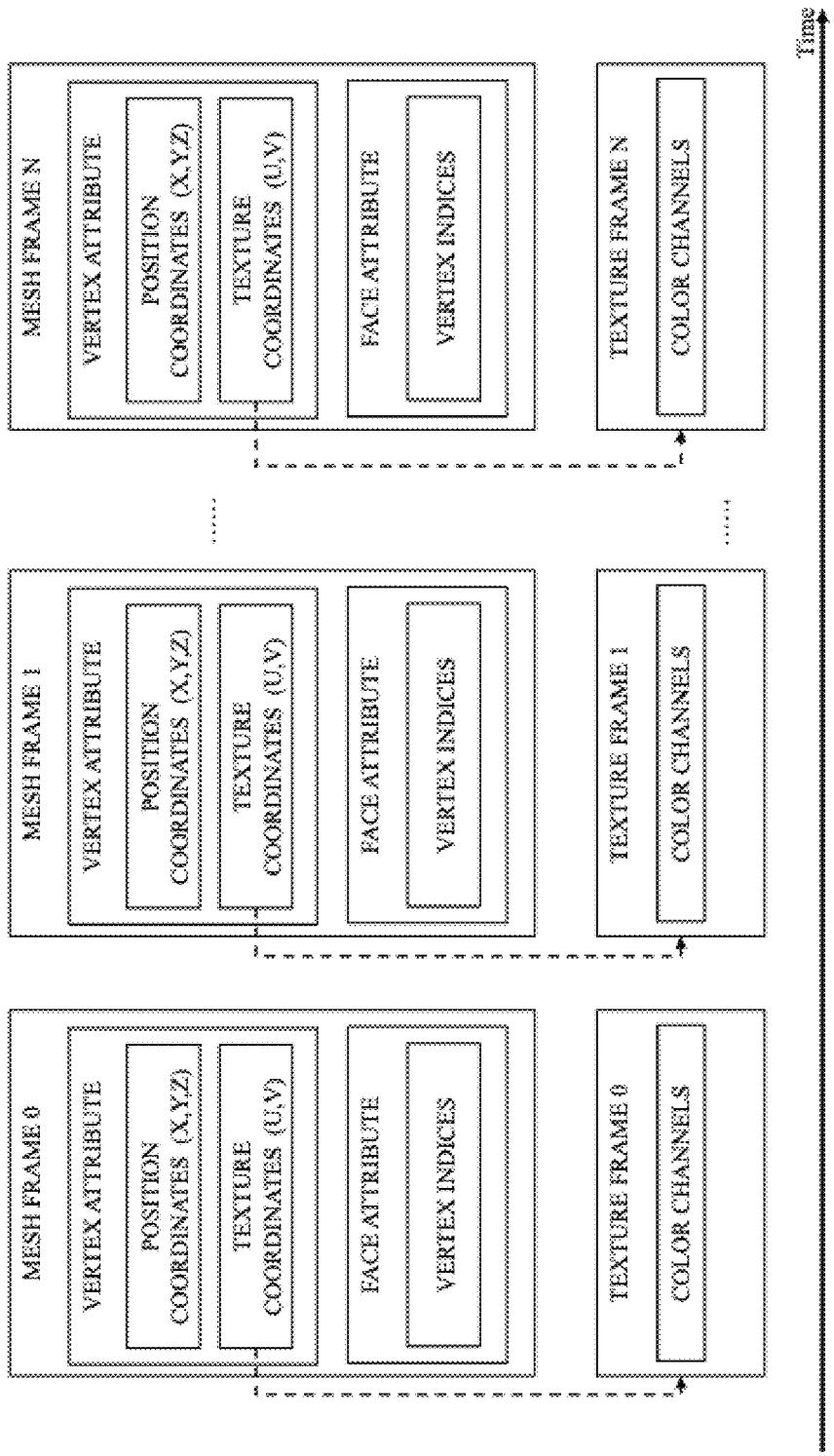
FIG. 4 is a block diagram showing a structure and attributes of a volumetric sequence and its components.
Figure 5:
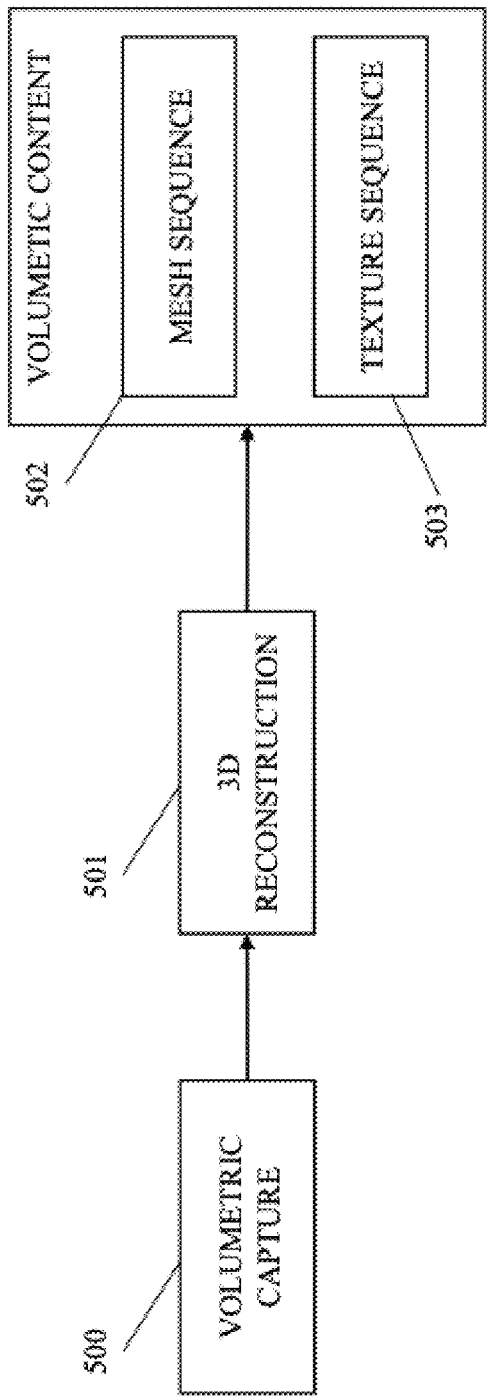
FIG. 5 is a flowchart for three-dimensional capture and encoding.

Turning now to FIG. 3, a block diagram of a system for mesh+texture tiling is shown in FIG. 3. Mesh 300 and texture sequence 301 are tiled, and new texture coordinate and texture maps 302 are generated using the re-UV and re-baking described with reference to FIG. 10. This process forms mesh tile sequences 303 and their corresponding texture (tile) sequences 304, which are then encoded using the same mesh encoder 306 and texture encoder 307 as described in FIG. 1 and FIG. 2 into mesh tile videos 309 and texture tile videos 310. To aid visibility test, bounding sphere information is calculated at 305 and saved as a bounding sphere video 308.

During the playback, in a first pass, distance and visibility testing unit 311 determines the visibility of each mesh tile (using the flow chart shown in FIG. 9) and forwards the visibility information to decoder control unit 314 for turning tile decoders on and off. However, this step does not involve any resolution switching. In a second pass, the distance and visibility testing unit 311 determines the distance from the viewer's center point to the center of bounding sphere of each mesh tile. This information is again fed into the decoder control unit 314. The control unit 314 will decide for each visible tile the right texture resolution decoder to enable while disable all other resolution decoders. Then, the texture decoder units 312 for visible tiles and mesh decoder units 315 for visible meshes will decode their associated mesh tiles and textures to generate visible tiles texture data 313 and visible tiles mesh data 316. The decoded data 313 and 316 are pushed into render pipeline 317 for rendering. Once render completes, the rendered image is displayed on the device screen display 318.

The resolution switching decision for texture files made by the decoder control unit 314 is made by taking into account the distance from the viewer, the total amount of pixel that are currently being decoded (of visible tiles), the number of available multi-resolution texture video tiers and the capability of the playback device. The capability of the playback device is mainly affected by hardware specification of the device, but such specification is not a convenient measurement for choosing the right resolution to decode. Since decoding and rendering performance is closely related to the number of pixels being decoded, the maximum number of decoding pixels is employed as the quantitative measurement of a device capability. For example, a high-end phone could have a capability of 4 million decoding pixels while a low-end has 1 million. In practice, the capability needs to be measured through a separate simulation programs that may run before the main system starts as a benchmarking process that may be relied upon throughout the use of the software on the particular device.

Figure 8:
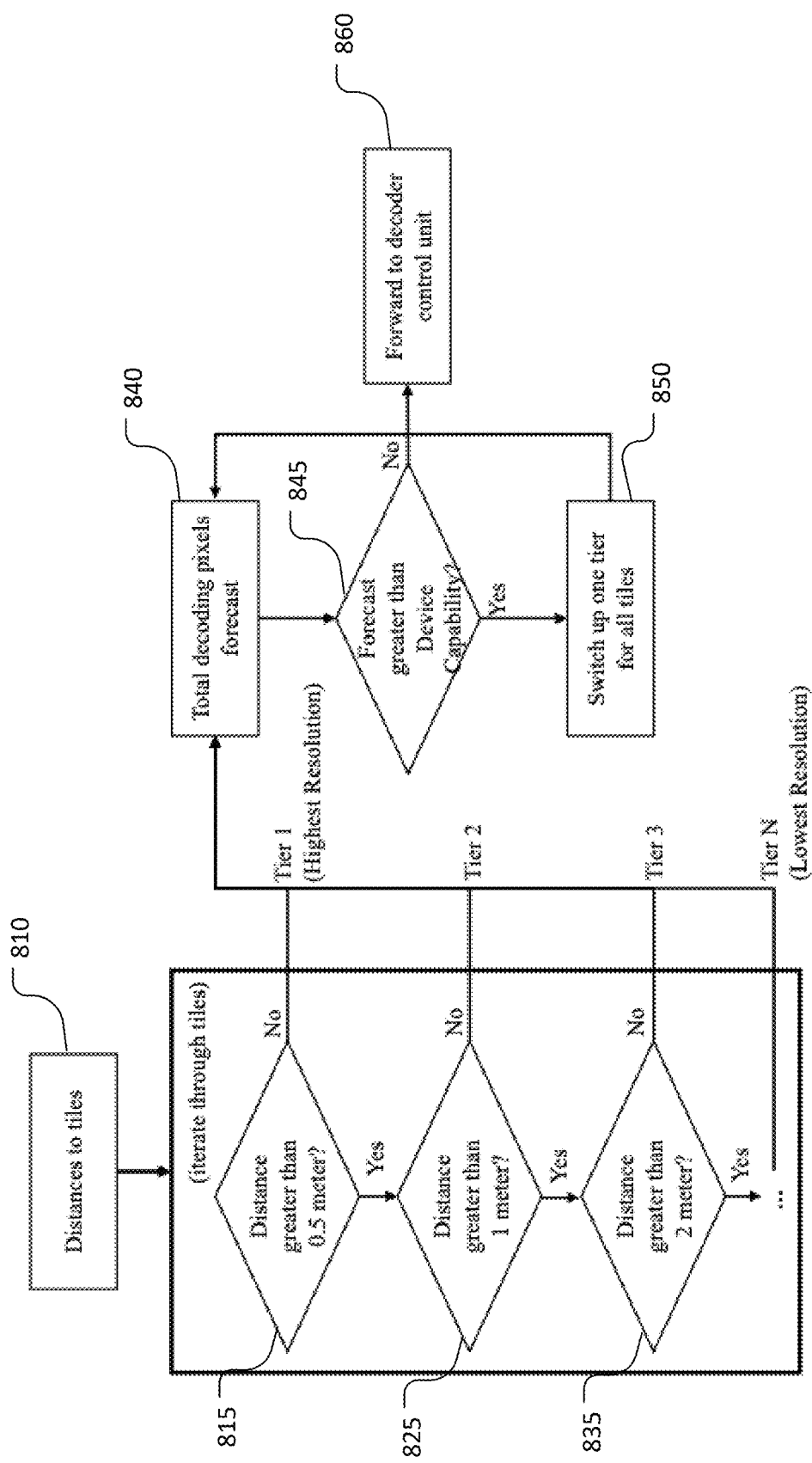
FIG. 8 is a flowchart of a method for selection of a preferred resolution for each visible tile.

A flowchart of a method for selection of a preferred resolution for each visible tile is illustrated in FIG. 8. First, the distances to the visible tiles are calculated at 810. Those distances can use the center of the bounding circles from the expected viewpoint/camera as discussed above. Those distances are compared against preset distance values. For tiles within 0.5 meters away from the viewer, the highest resolution (tier 1) is chosen. For tiles that are between 0.5 meters to 1 meter away, the second tier is chosen, etc. Each of those options is presented as elements 815, 825, and 835, but there may be many difference distances, or only a small subset of distances. Differences of one half a meter, then every meter are shown, but the ranges could be dynamic as well, with ranges of distance for a first tier being up to 9 meters or some other distance, then further out tiers being 9-15 meters, with the next tier being 15-40 meters and so on. The distances are somewhat arbitrary but based upon human visual perception of quality at the expected distances.

The process continues until either a suitable resolution is chosen for the given distance or the tiers has been exhausted. Once the tiers are selected for each visible tile, the total amount of pixels that will be decoded is forecast at 840 using the resolution information associated with each tier. The total number of pixels are the different shapes and colors that will be reproduced if a given tier level of render is used. The total is for all mesh and texture tile combinations, not just one. In this way, the entire expected render can be pre-processed to determine if it will exceed the capabilities of the device on which it is to be rendered. This forecast of total decoding pixels is subjected to a second test where it is compared against the device capability (measured as the maximum number of decoding pixel) at 845. The objective here is to decrease texture resolution on all tiles such that the total number of pixel falls below the capability of the device. If it does exceed the capability ("yes" at 845), then a higher tier (lower quality) is used for the resolution by switching up by one tier for all tiles at 850. If it is not ("no" at 845), then the proposed textures for each mesh tile may be forwarded to decoder control unit at 860. This iterative process ends in two possible conditions, the tier increases to the point where the condition is satisfied, or tiers has been exhausted for all tiles. Once the decision of resolution tier is made for each visible tile, the corresponding decoders will be enabled while all others are disabled.

Figure 12:
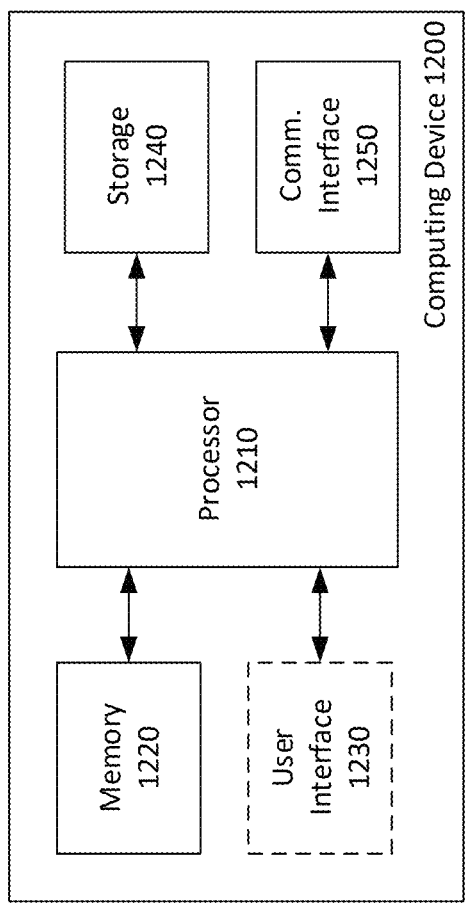
FIG. 12 is a block diagram of a computing device.

Turning now to FIG. 12, is a block diagram of an exemplary computing device 1200, which may a device used to operate as any of the systems of FIGS. 1, 2, and 3, and to accomplish the processes shown in other figures in this patent. As shown in FIG. 12, the computing device 1200 includes a processor 1210, memory 1220, optionally, a user interface 1230, and a communications interface 1240. Some of these elements may or may not be present, depending on the implementation. Further, although these elements are shown independently of one another, each may, in some cases, be integrated into another.

The processor 1210 may be or include one or more microprocessors, microcontrollers, digital signal processors, application specific integrated circuits (ASICs), or a system-on-a-chip (SOCs). The memory 1220 may include a combination of volatile and/or non-volatile memory including read-only memory (ROM), static, dynamic, and/or magnetoresistive random access memory (SRAM, DRM, MRAM, respectively), and nonvolatile writable memory such as flash memory.

The memory 1220 may store software programs and routines for execution by the processor. These stored software programs may include an operating system software. The operating system may include functions to support the communications interface 1240, such as protocol stacks, coding/decoding, compression/decompression, and encryption/decryption. The stored software programs may include an application or "app" to cause the computing device to perform portions of the processes and functions described herein. The word "memory", as used herein, explicitly excludes propagating waveforms and transitory signals.

The user interface 1230, if present, may include a display and one or more input devices such as a touch screen, keypad, keyboard, stylus or other input devices.

Storage 1240 may be or include non-volatile memory such as hard disk drives, flash memory devices designed for long-term storage, writable media, and proprietary storage media, such as media designed for long-term storage of photographic or video data. The word "storage", as used herein, explicitly excludes propagating waveforms and transitory signals.

The communications interface 1250 may include one or more wired interfaces (e.g. a universal serial bus (USB), high definition multimedia interface (HDMI)), one or more connectors for storage devices such as hard disk drives, flash drives, or proprietary storage solutions. The communications interface 1250 may also include a cellular telephone network interface, a wireless local area network (LAN) interface, and/or a wireless personal area network (PAN) interface. A cellular telephone network interface may use one or more cellular data protocols. A wireless LAN interface may use the WiFi® wireless communication protocol or another wireless local area network protocol. A wireless PAN interface may use a limited-range wireless communication protocol such as Bluetooth®, Wi-Fi®, ZigBee®, or some other public or proprietary wireless personal area network protocol. When the computing device 200 is deployed as part of a camera and LIDAR rig, such as the system 100. The cellular telephone network interface and/or the wireless LAN interface may be used to communicate with devices external to the computing device 1200.

The communications interface 1250 may include radio-frequency circuits, analog circuits, digital circuits, one or more antennas, and other hardware, firmware, and software necessary for communicating with external devices. The communications interface 1250 may include one or more specialized processors to perform functions such as coding/decoding, compression/decompression, and encryption/decryption as necessary for communicating with external devices using selected communications protocols. The communications interface 1250 may rely on the processor 1210 to perform some or all of these function in whole or in part.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for processing volumetric video comprising:
   receiving three-dimensional mesh data and texture data defining three-dimensional and textural characteristics of a physical location captured as volumetric video;
   dividing the three-dimensional mesh data into sub-parts defining a mesh tile, each mesh tile making up only a portion of the three-dimensional mesh data;
   identifying a sub-part of the texture data defining a texture tile, the texture tile corresponding to each of the sub-parts of the mesh tiles and including only texture data relevant to an associated mesh tile;
   generating a bounding object for each mesh tile;
   encoding each mesh tile independent of the three-dimensional mesh data as a mesh tile video and each texture tile independent of the texture data as a texture tile video;
   receiving the mesh tile video and the texture tile video at a graphical processing unit;
   testing whether, from a perspective of a viewer of the volumetric video, the bounding object is visible, at least in part, to the viewer;
   if the bounding object is visible, flagging the corresponding mesh tile and associated texture tile to be decoded and rendered; and
   if the bounding object is not visible, flagging the corresponding mesh tile and associated texture tile to not be decoded or rendered;
   decoding the mesh tile video and the texture tile video;
   rendering the mesh tile video and the corresponding texture tile video on a display.

2. The method of claim 1 further comprising:
   prior to encoding, generating at least one high resolution version and at least one lower resolution version of each texture tile;
   prior to rendering, determining a virtual distance from a viewer of a volumetric video at which each mesh tile will be rendered; and
   selecting a resolution of each texture tile between the at least one high resolution version and the at least one lower resolution version dependent upon the virtual distance.

3. A system for processing volumetric video comprising:
   a camera rig for capturing volumetric video for a physical location;
   a processor for:

receiving the volumetric video comprising three-dimensional mesh data and texture data defining three-dimensional and textural characteristics of the physical location captured;

dividing the three-dimensional mesh data into sub-parts defining a mesh tile, each mesh tile making up only a portion of the three-dimensional mesh data;

identifying a sub-part of the texture data defining a texture tile, the texture tile corresponding to each of the sub-parts of the mesh tiles and including only texture data relevant to an associated mesh tile;

generating at least one high resolution version and at least one lower resolution version of each texture tile;

encoding each mesh tile independent of the three-dimensional mesh data as a mesh tile video and each texture tile independent of the texture data as a texture tile video; a second processor, wherein the second processor is further for:

receiving the mesh tile video and the texture tile video at a graphical processing unit;

decoding the mesh tile video and the texture tile video;

prior to rendering, determining a virtual distance from a viewer of a volumetric video at which each mesh tile will be rendered; and selecting a resolution of each texture tile between the at least one high resolution version and the at least one lower resolution version dependent upon the virtual distance; and rendering the mesh tile video and the corresponding texture tile video on a display.

4. The system of claim 3 wherein the processor is further for, prior to encoding, generating a bounding object for each mesh tile, and the second processor is further for:

prior to decoding, testing whether, from a perspective of a viewer of the volumetric video the bounding object is visible, at least in part, to the viewer; and if the bounding object is visible, flagging the corresponding mesh tile and associated texture tile to be decoded and rendered; and if the bounding object is not visible, flagging the corresponding mesh tile and associated texture tile to not be decoded or rendered.

5. A method for processing volumetric video comprising:

receiving three-dimensional mesh data and texture data defining three-dimensional and textural characteristics of a physical location captured as volumetric video;

dividing the three-dimensional mesh data into sub-parts defining a mesh tile, each mesh tile making up only a portion of the three-dimensional mesh data;

identifying a sub-part of the texture data defining a texture tile, the texture tile corresponding to each of the sub-parts of the mesh tiles and including only texture data relevant to an associated mesh tile;

generating at least one high resolution version and at least one lower resolution version of each texture tile;

encoding each mesh tile independent of the three-dimensional mesh data as a mesh tile video and each texture tile independent of the texture data as a texture tile video receiving the mesh tile video and the texture tile video at a graphical processing unit;

decoding the mesh tile video and the texture tile video; and determining a virtual distance from a viewer of a volumetric video at which each mesh tile will be rendered;

selecting a resolution of each texture tile between the at least one high resolution version and the at least one lower resolution version dependent upon the virtual distance; and rendering the mesh tile video and the corresponding texture tile video on a display.

* * * * *